United States Patent

[11] 3,570,525

[72] Inventors Adolph W. Borsum;
William K. Borsum, 521 Pacific Ave., Solana Beach, Calif. 92075
[21] Appl. No. 825,100
[22] Filed Apr. 21, 1969
[45] Patented Mar. 16, 1971
Continuation-in-part of application Ser. No. 627,595, Mar. 29, 1967, now abandoned.

[54] STEM-ACTUATED TILTABLE VALVE
8 Claims, 9 Drawing Figs.
[52] U.S. Cl. .................................................. 137/320,
251/346, 251/350, 251/354, 128/66
[51] Int. Cl. ...................................................... F16k 43/00,
A61h 13/00, F16k 31/56
[50] Field of Search .......................................... 137/320,
322; 251/341, 346, 348, 349, 350, 353, 354;
239/576, 577; 128/65, 66, 239, 247; 222/320

[56] References Cited
UNITED STATES PATENTS
| 703,103 | 6/1902 | Weber | 128/239 |
|---|---|---|---|
| 1,300,611 | 4/1919 | Henemier | 251/354 |
| 1,899,506 | 2/1933 | Hutt | 251/354X |
| 2,984,452 | 5/1961 | Hooper | 251/228 |
| 3,199,834 | 8/1965 | Short | 251/228 |
| 3,393,673 | 7/1968 | Mattingly | 128/66 |

Primary Examiner—Alan Cohan
Assistant Examiner—David R. Matthews
Attorneys—R. I. Tompkins and Paul N. Critchlow ABSTRACT: A bidirectional valve controls delivery of the normal fluid flow through a tubular passage and prevents backflow into the fluid source. For this purpose, axially spaced first and second valve seats are provided in the bore of the tube and a valve body, disposed between the seats, utilizes the supply pressure to normally urge its face portion into a closing position on the first seat. A manually operable, plunger-type stem actuator is used to tilt the valve body to open the first seat and permit delivery of the fluid, this actuator being slidably received in the tube to form a continuation of the tube bore. Preferably the actuator is a separate member facilitating its removal for replacement or sterilization purposes. The second valve seat normally is open during delivery but immediately closed by backflow pressure such as may be produced by sudden pressure failures in the upstream delivery system. In one embodiment the valve body has a single valve face reciprocately movable between the seats in response to the fluid pressure. Another embodiment employs a pair of valve faces both of which are resiliently held against both seats to block delivery flow. When the stem actuator tiltably opens the first seat, the delivery pressure tiltably opens the second. Back pressure causes the second seat to immediately close, the force of the closing action being supplemented by the resiliency of the arrangement.

Patented March 16, 1971 3,570,525
2 Sheets-Sheet 1
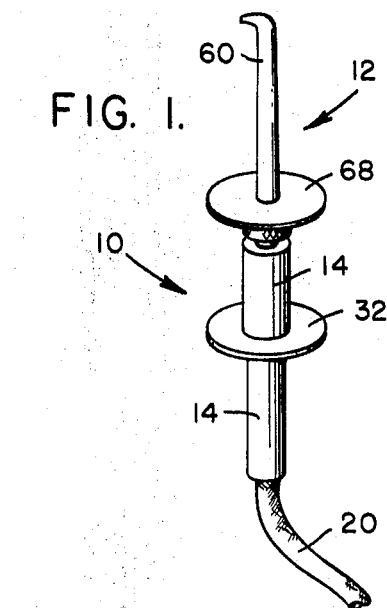
FIG. 1.
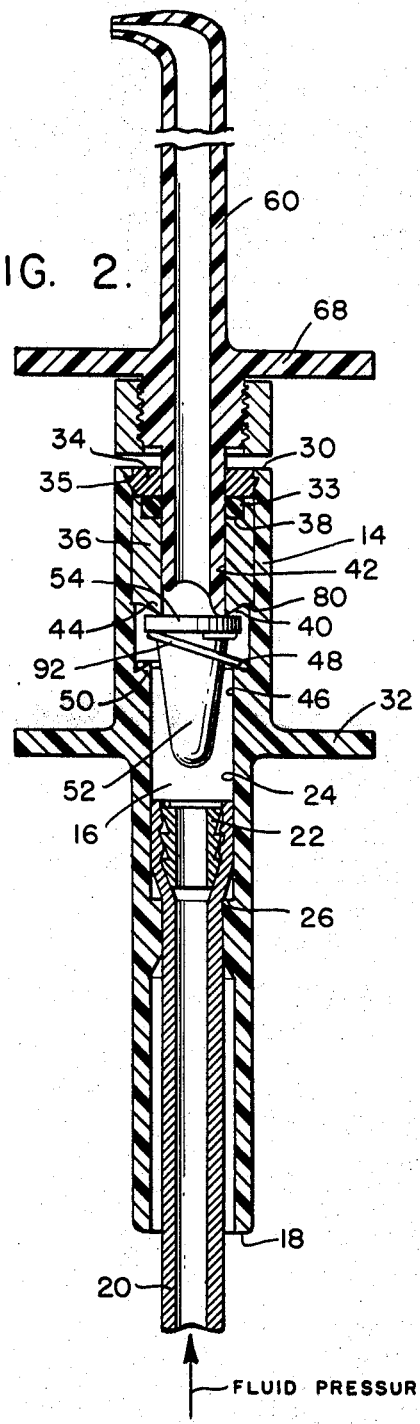
FIG. 2.
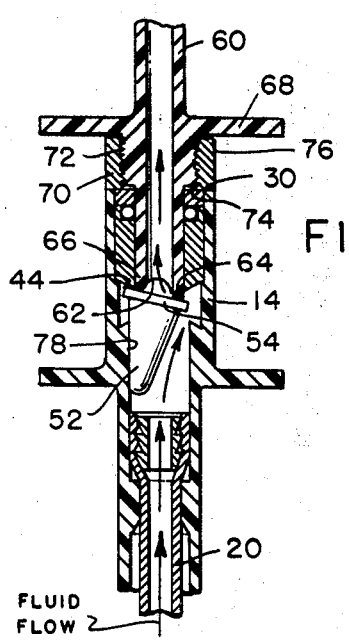
FIG. 3.
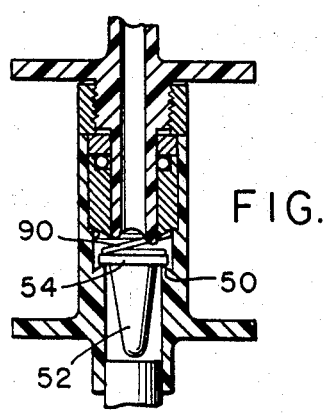
FIG. 5.
FIG. 4.
INVENTORS.
ADOLPH W. BORSUM
WILLIAM K. BORSUM
BY Joseph H. Golant
ATTORNEY.

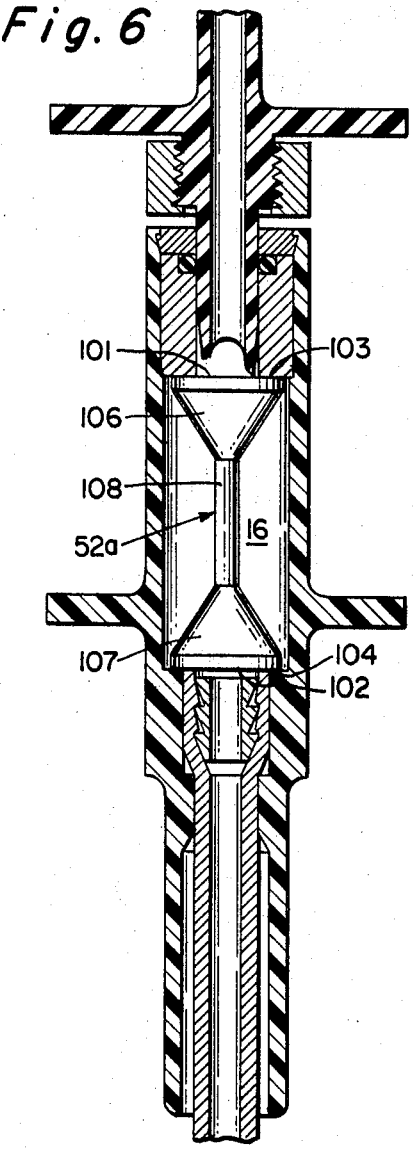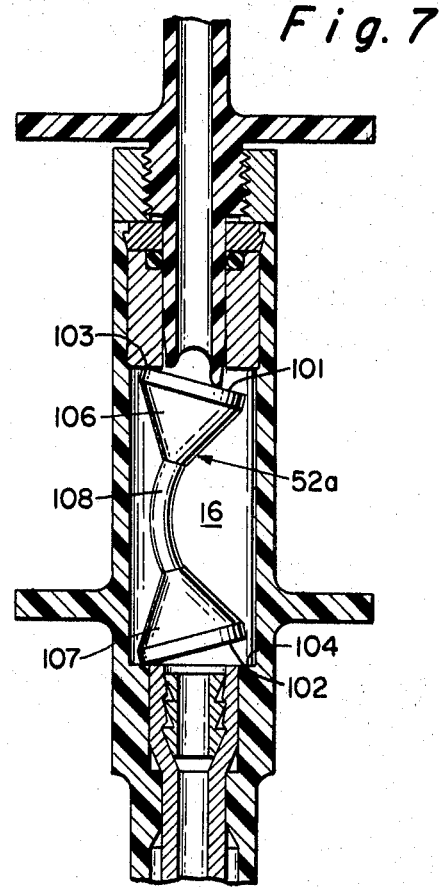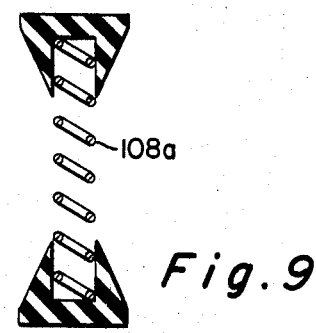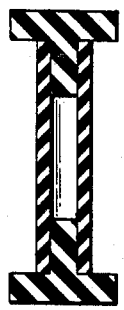
Fig. 6
Fig. 7
Fig. 8
Fig. 9
INVENTORS
ADOLPH W. BORSUM
WILLIAM K. BORSUM
BY
ATTORNEY

STEM-ACTUATED TILTABLE VALVE

The present application is a continuation-in-part of an abandoned application "Stem-Actuated Valve," Ser. No. 627,595, filed by the present inventors Mar. 29, 1967.

The invention described herein may be manufactured and used by or for the Government of the United States of America for governmental purposes without the payment of any royalties thereon or therefor.

BACKGROUND OF THE INVENTION

1. Field of the Invention

The invention relates to bidirectional valves and more particularly to valve systems adapted to automatically block reversals of fluid flow.

2. Description of the Prior Art

Valves are old in the art and are well represented by numerous existing patents. Fluid flow devices such as syringes are widely known and used especially in the medical, dental, veterinarian and nursing professions in hospitals and laboratories throughout the world. These fluid flow devices usually are expensive because of intricate manufacturing processes and complicated internal parts. In the usual case the fluid flow device is permanently attached to other pieces of much larger equipment whether it be in a doctor's office or in the operating room of a hospital. These fluid flow devices are not easily or economically replaced and all too often cleansing or sterilization may be neglected by overworked staff.

Prior-art fluid flow devices normally require particular and careful handling by a user if the instrument is to be operated correctly. In the case of a syringe there usually is an on-off button which a doctor or assistant must press with his thumb to cause a flow of fluid. Such operations require that the operator grasp the syringe in only one specific manner with one hand such that his thumb falls over the valve-actuating button. When properly grasped, the other hand then is required to rotate the nozzle into the desired general direction relative to the area to be flushed. Also, the prior art fluid flow devices usually have a fixed nozzle head or interchangeable heads requiring a great deal of time to change.

Another difficulty is the relative inability of these devices to protect against backflows such as frequently result when upstream pressure failures produce a vacuum causing a reverse pressure differential in the fluid line. Contaminated fluid then is drawn back to the central fluid source and all subsequent users are endangered. Many states and communities now have laws requiring backflow prevention. The National Plumbing Code, for example, requires a "backflow preventer" to prevent contamination of potable community water systems by such potential dangers as infectious oral debris, microbal or poisonous debris from home lavatories, kitchen sinks, commercial laboratories, hospital facilities, and other such facilities.

SUMMARY OF THE INVENTION

The present invention provides a stem actuated valve comprising a tubular body having a bore, an upstream end and a downstream end. The downstream end is adapted to receive longitudinally a stem actuator while the upstream end is adapted to communicate with a fluid source. The body is comprised of a first annular valve seat located near the downstream end, a second annular valve seat located between the first valve seat and the upstream end of the body and a valve means or body disposed within the bore between the first and second valve seats. The valve body is adapted to close one or both of the seats depending upon the pressure conditions. Reciprocation of the stem actuator tiltably opens the first valve seat to permit delivery flow through both valve seats. Backflow pressure forces the valve body against the second seat to close the seat and prevent the backflow.

An object of the invention is to provide a stem-actuated valve which is inexpensive to manufacture, simply constructed and easy to use.

Another object is to incorporate in the valve means to automatically shut off backflow.

Another object of the invention is to provide a stem actuated valve for a fluid flow device which is easily handled and grasped by only one hand without special conscientious effort or prior training and yet for a syringe-type embodiment enables the user to completely regulate the flow of fluid through the device and the direction of impingement of the fluid after it leaves the device.

A further object of the invention is to provide a stem-actuated valve that allows rapid interchangeability of stem actuators, each having a different function, so as to enlarge the field of application of the device as well as to save valuable operating time, whatever the application.

A still further object of the invention is to provide a stem-actuated valve device that is adapted to allow proper sanitary procedure in that the valve device may be thrown away or easily removed to be sterilized along with other medical, dental or laboratory instruments and, in addition, is constructed to prevent backflow contamination of a fluid source.

Other objects, advantages and novel features of the invention will become apparent from the following detailed description of the invention when considered in conjunction with the accompanying drawings wherein:

BRIEF DESCRIPTION OF THE DRAWING

FIG. 1 is a perspective view of the valve of the invention illustrating a configuration in which it is used as a syringe;

FIG. 2 is a partial front section view of one embodiment of the invention showing the valve in a closed position;

FIG. 3 is a partial front section view showing the FIG. 2 valve in an open position;

FIG. 4 is a partial front section view showing the valve in a "backflow preventer" position;

FIG. 5 illustrates an alternate form of the fluid conduit end;

FIG. 6 is a fragmentary view similar to FIG. 2 but showing another embodiment having a dual tilt arrangement;

FIG. 7 is a view of the FIG. 6 valve showing the dual tilt valve in an open, fluid-delivering position; and FIGS. 8 and 9 are alternative body constructions for use in the dual tilt arrangement.

DESCRIPTION OF THE INVENTION

Referring now to the drawings where like numerals designate like or corresponding parts throughout the several views, there is shown in FIG. 1 a preferred embodiment of the invention illustrating the two interrelated parts of the invention, a handpiece 10 and a stem actuator 12.

The handpiece 10 is comprised of a body 14, FIG. 2, which may be tubular, having a longitudinal central bore 16 running the length of the tubular body and terminating at an upstream end 18 which is adapted to communicate with a fluid source by way of fluid conduit 20. The other end of the tubular body, hereinafter called the downstream end 30, is adapted to receive the stem actuator 12 in a longitudinal fashion as shown in FIGS. 2, 3 and 4.

Disposed about and connected to the tubular body 14 may be an annular flange 32 which is so placed as to facilitate convenient hand holding of the handpiece 10 and for control of the tubular body 14. Under normal use the handpiece may be held naturally in the user's hand with the flange 32 naturally falling between the user's second and third fingers or his first and second fingers whichever is most convenient. As shown, the flange 32 may be made integral with the tubular body 14 or may be eliminated entirely for certain applications.

The fluid conduit 20 may be received by the upstream end 18, FIG. 2, so that the conduit 20 opens to the bore 16 of the tubular body. The conduit may be of any suitable material which is in common use and well known in the art. Any suitable connection may be used, such as shown in FIG. 2 where a tube expander 22 wedges the fluid conduit in place by forcing the conduit to engage the inner surface 24 of the tubular body and the ledge 26 which is a transversely projecting section of the inner wall 24. FIG. 5 is an alternative connection having fluid conduit 20a with a transversely projecting end 28 which may be so designed as to engage ledge 26, and thus remove the need for the tube expander 22.

Within the bore 16 toward the downstream end 30 may be an O-ring 33 which is held in place by a retainer ring 34 on the downstream side of the O-ring and a cylindrical insert 36 on the upstream side. Retainer ring 34 may be a snap ring suitably retained by groove 35 in the tubular body 14. Any other suitable retainer may be used, however. The O-ring 33 serves two functions; first it frictionally engages the stem actuator 12 once a user has inserted the actuator into the bore 16 of the handpiece 10; and second, the O-ring seals the handpiece to prevent escape of the fluid which may flow through the fluid conduit and the handpiece. The O-ring, however, is designed, constructed and located so that the actuator 12 may be slidable longitudinally in an upstream and a downstream direction and rotated 360° without excessive effort by a user.

The cylindrical insert 36 retains the O-ring at one end in an annular slot 38 while at the other end forms a first annular valve seat. The first annular valve seat comprises a slanted face 40 which is facing in a generally upstream direction, the slanted face being in a generally transverse direction such that the slanted face 40 and the inner surface 42 of the cylindrical insert 36 form a generally acute angle designated 44 (the vertex of the acute angle may be rounded or flattened to prevent possible damage by sharp edges). A second annular valve seat is formed between the first annular valve seat and the upstream end 18 by a generally transversely projecting ledge within the bore 16, the projecting ledge having a generally transversely slanted face 48 such that the slanted face 48 and the surface 24 of the bore form a generally acute angle designated 50 (again, the vertex may be flattened or rounded), with the slanted face 48 facing in a generally downstream direction. As seen in FIG. 2, the first valve seat and the second valve seat form a generally trapezoidal configuration in cross section with the smaller of the parallel sides being open.

A valve means located within the bore 16 may be comprised of a generally conically shaped body 52 tapered in an upstream direction and having a base directly connected to the disc 54; the disc 54 is confined to move between the first valve seat and the second valve seat enabling the valve means to close the bore of the tubular body to the passage of fluid by engaging either the first seat or the second seat. The disc 54 and body 52 may be made integral.

The valve means is so designated and constructed to selectively engage one or the other of the valve seats; the determination of which valve seat will be engaged depends upon the pressure at the fluid source. When the fluid conduit 20 is connected to a fluid source having a pressure greater than the external or environmental pressures, a force is created acting upon the upstream side of the disc 54. The pressure is usually that necessary to create a fluid flow. Since downstream of the disc 54 the pressure, for example, may be atmospheric, any pressure greater than one atmosphere upstream of the disc 54 will produce forces upon the conically shaped body 52 and upon the disc 54 to cause the disc to engage the first valve seat at the vertex of the acute angle 44 as shown in FIG. 2. Thus, with the disc 54 in contact with the first valve seat a flow of fluid in the upstream to downstream direction, that is, a flow through the fluid conduit, through the handpiece 10 and out through the nozzle actuator 12, is prevented. However, if the pressure existing in the fluid conduit should suddenly drop below that of atmospheric, that is, should a partial vacuum be created in the fluid conduit 20 the pressure acting upon disc 54 downstream would still be about one atmosphere while the pressure upstream of disc 54 and body 52 would be less than one atmosphere. This pressure differential causes the valve means to be pressed firmly against the second valve seat such that the disc 54 engages the vertex of the acute angle 50 as shown in FIG. 4. In such a position the valve means becomes a "backflow preventer" preventing the suction of potentially dangerous material from being drawn in through the stem actuator 12 and being carried back to a central fluid source (not shown).

One of the major advantages of the invention is the automatic backflow preventer. This eliminates one of the major health hazards of the prior art fluid flow devices since in many cases the device may be in contact with diseased or infected parts of the human body or in contact with other infectious, poisonous or undesirable chemical or materials.

The stem actuator 12 may be comprised of a tubular body 60 with an end 62 being adapted to be longitudinally received by the handpiece 10. The end 62 received by the handpiece 10, as seen in FIGS. 2, 3 and 4, is transversely slanted and notched so that in a longitudinal cross section view, FIG. 3 for example, a longer arm 64 and a shorter arm 66 are formed with a notched position between the two arms. The reason for the notched portion is to prevent sealing engagement between the valve disc 54 and the actuator end 62.

Disposed about the tubular body 60 may be an annular flange 68 which is directly connected to and may be integral with the stem actuator and facilitates the application of finger forces to cause movement of the actuator. During a normal operation of the invention, the handpiece 10 will normally fit within a user's hand. With the inclusion of the stem actuator, flange 68 fits naturally adjacent the index finger and thumb. The index finger and the thumb are, therefore, able to act together to either rotate the flange 68 and thereby the tubular body 60, or to slidably move the tubular body 60 into and out of the handpiece 10 in a longitudinal direction or, the thumb may be used alone to slide the actuator. As mentioned earlier, the O-ring 33 frictionally holds the nozzle actuator in place; however, only slight finger and/or thumb force is necessary to overcome the friction to cause movement longitudinally or to cause rotational movement without breaking the seal provided by the O-ring.

Between the end 62 and the flange 68 may be an adjustment nut 70, FIG. 3, which may be rotatably mounted upon the actuator 12 by being threaded at 72 to the tubular body 60. The adjustment nut 70 is adapted to be rotated along the threads causing longitudinal movement of the nut. The movement will determine the distance that the stem actuator is able to penetrate the handpiece 10 because an end 74 of the adjustment nut 70 will abut the downstream end 30 of the tubular body 14 once the actuator is inserted. The outer surface 76 of the adjustment nut may be knurled to allow ease of turning even if wet. An alternative location for the adjustment nut 70 may be at the downstream end 30 of the body 14. This location would eliminate the necessity of providing an adjustment nut for each stem actuator.

The simplification of design of the stem actuator 12 allows a user to easily design and construct any specialized stem nozzle for his particular use in combination with our device. All that he need have is a common stem which is to be received by the handpiece 10 and actuate the valve means.

As viewed in FIG. 2 the off position of the valve is shown. The static fluid pressure within the fluid source forces the disc 54 into engagement with the first valve seat. In order to open the valve, finger pressure is applied to the flange 68, FIG. 3, in an upstream direction so that the stem actuator is longitudinally moved in an upstream direction (downward in the drawing) until the adjustment nut end 74 abuts the downstream end 30 of the tubular body 14. Meanwhile the longer arm 64 pushes upon the disc 54 causing a partial disengagement of the disc 54 from the first valve seat. This partial disengagement allows fluid to pass around and over the disc 54 through the notch in end 62 and enter the tubular body 60 as shown by the arrows. In the FIG. 3 position the valve means is tilted and balanced between the force acting in an upstream direction provided by the operator's fingers acting through the flange 68 and the longer arm 64 while a downstream force is provided by the combined pressures of the fluid flow around disc 54 and within the fluid source. When the disc 54 is tilted open the fluid must flow around it before entering the stem actuator. A ratio of transverse areas comparing the area of the conduit 20 and the area between the disc 54 and the bore wall is indicative of the velocity achieved about the disc 54 and thereby indicative of the force applied to the upstream side of the disc. The smaller the area about the disc as compared to that of the fluid conduit 20, the greater will be the tendency of the disc to snap shut when the finger forces upon the flange 68 are removed. Conversely, the greater the area about the disc, the more sluggish the disc closure becomes. The result of the forces is that the valve means tilts using as a fulcrum the vertex of the acute angle 44 which lies, generally, immediately adjacent to and upstream of the shorter arm 66. In the full open position the conically shaped body 52 will engage the surface of the bore 16 along the line designated 78.

The valve will remain open as long as the user's fingers (index finger and/or thumb) supply sufficient force to overcome the opposing force created by the combined pressures within the system. The force required will be extremely small since as part of the invention the valve is so constructed that only a partial disengagement from the valve seat is necessary. Even a small child could operate the invention without excessive effort. If a lesser flow is desired the adjustment nut 70 may be easily adjusted to extend further in an upstream direction so as to cause an earlier abutment between its end 74 and the downstream end 30. An earlier abutment would mean that the longer arm 64 would not extend so far into the bore 16 as is shown in FIG. 3. Such being the case, the valve means would not tilt as much as is shown and thus less fluid would be able to flow through the opening created.

It is noted that if a partial vacuum should suddenly occur within the fluid sources (assuming atmospheric conditions elsewhere), differential pressure immediately would cause the valve means to engage the second valve seat thus preventing a backflow (FIG. 4). As soon as the pressure changes the valve means will release itself from the second valve seat and return to a FIG. 3 or FIG. 2 configuration. Thus the system does not relay upon a user to sense that a partial vacuum has been created within the fluid line. Instead the valve automatically senses the abnormal pressure differential and compensates for it.

In some embodiments the size of the device or excessive source pressure may require that a helping spring means such as coil spring 90, FIG. 4, be placed within the bore 16 with one end of the spring connected to the first annular valve seat and the other end connected to the disc 54 of the valve means. When a user attempts to cause the stem actuator to open the valve, the coil spring 90 may help to cause disengagement by biasing the disc 54 away from engagement with the first annular valve seat. An embodiment with the coil spring 90 may also be useful if it is desired to protect against a backflow when the source pressure is turned off.

In other embodiments the conduit pressure may not be sufficient to overcome the frictional forces on the stem actuator 12 by the O-ring 33 so that after the release of the finger forces on flange 68, the valve means does not engage the first valve seat automatically. A spring means, such as coil spring 92, FIG. 2, may be placed in the bore 16 with one end connected to the disc 54 and the other end connected to the second valve seat. This arrangement causes the valve means to be biased closed when the finger forces are released so that engagement of disc 54 and the first annular valve seat occurs.

In still another embodiment of the device, the stem actuated valve may be operated as an aspirator. In this embodiment the stem actuator may be attached to a vacuum pump or other vacuum source and a nozzle tip may be placed at the upstream end replacing the fluid conduit 20. In essence the device is turned about to function as a suction apparatus. In such a configuration only the first valve seat is needed and a biasing spring placed like coil spring 92 about the valve means may be desired to help closure.

The above-mentioned elements of the invention may be constructed of any suitable material with preference in material depending upon the application of the device. As will be recognized, it provides a simple, relatively inexpensive structure that materially facilitates sanitary or hygenic maintenance. The cost and simplicity also permit applications that heretofore have been cost restrictive or restricted because of the complexity of the equipment involved. Since no special skills are needed the public easily may use the device for a number of purposes. For example, it is ideally adapted for use as a hydraulic and mechanical means to cleanse the mouth and teeth. Stem actuators may be designed for such a use and used as part of a system in which other actuators are designed for other purposes.

FIG. 6 shows an important modification which, for descriptive purposes, can be identified as a dual tilt valve arrangement. Referring to FIG. 6 and comparing it with the previously described valve of FIG. 2 the principal difference is seen to be in the shape of the flow-controlling valve body. More specifically, the conical, single-disc valve body 52 of FIG. 2 is replaced by a valve body 52a having a pair of valve faces 101 and 102 adapted under normal conditions to simultaneously cover or close a pair of first and second valve seats 103 and 104. In effect, the FIG. 2 valve body responsively moves or reciprocates between its first and second seating positions, while the FIG. 6 valve body remains relatively stationary and controls flow by tiltably opening both of its faces in a manner to be described.

Other differences between FIGS. 2 and 6 are first that central bore 16 of FIG. 6 is in the form of a smooth-walled cylinder rather than one interrupted by the radial seat 48 of FIG. 2, and, secondly, that its valve seats 103 and 104 are flat-surfaced rather than having the slanted form of the FIG. 2 embodiment. The latter change is optional but represents a cost-reducing simplification. As may be noted, seat 104 is, in effect, the upstream end of fluid conduit 20 of FIG. 2. Except for these structural differences, the dual-tilt valve arrangement illustrated in FIG. 6 can be patterned after the FIG. 2 arrangement and the design considerations affecting both are somewhat similar. Thus, for example, the materials used in both should, for most intended purposes, be relatively nonporous to facilitate cleaning and also should be heat-resistant to permit sterilization. The durometer and other physical properties of the rubber elements can be varied to suit particular conditions and, to some extent, the optimum length and form of valve body 52a will depend upon these properties.

Referring again to FIG. 6, it will be seen its valve body 52a generally is a resilient, flexible rubber element having an hour-glass shape provided by a pair of radially enlarged, conically shaped, end flange members 106 and 107 medially coupled one to the other by a flexible rubber rod or tube 108. In FIG. 6, the valve body has an integral, molded construction although it can be replaced by the three-part construction of FIG. 8 which utilizes a rubber tube 108 and disclike end flanges have rodlike projections supporting the tube. FIG. 9 shows another modification of the valve body construction in which the rubber tube of FIG. 8 is replaced by a coil spring 108a. The spring, as also is true of the rubber tube, has been found to function as effectively as the integral structure of FIG. 6.

The dual tilt arrangement functions in a rather obvious manner to control both delivery and backflow. In FIG. 6, for example, it can be assumed that no flow has been initiated and the valve elements are in their fabricated dispositions with valve faces 101 and 102 firmly pressed against and closing seats 103 and 104. To achieve this end, the entire valve body 52a is disposed in a compressed state in cylindrical bore 16, the compression being sufficient to effectively close the valve seats but not so great as to produce a bend or distortion in rod 108 or spring 108a, if such a spring is used. Rod 108 or its counterpart thus normally extends axially of bore 16 to exert its force in a balanced manner medially upon the end flanges.

When fluid flow first is initiated, its upstream pressure causes valve face 102 to tilt away from its seat in the manner shown in FIG. 7 and permits the fluid to enter bore 16. The initial flow continues until the bore is filled and the fluid pressure in the bore equals or substantially offsets the force of the upstream pressure. At this point, the compressive force inherent in valve body 52a is sufficient to cause valve face 102 to close and resume the FIG. 6 disposition.

To promote delivery of the fluid through the nozzle of stem actuator 60, the actuator is pressed inwardly causing valve face 101 to tilt in the manner previously described. The tilting permits the fluid in bore 16 to escape and the fluid pressure in the bore to be reduced sufficiently to again permit the tiltable opening of valve seat 104. Flow then is established past both valve seats and it will continue as long as the stem actuator holds face 101 in its opened position.

The FIG. 6 embodiment is particularly advantageous as a backflow preventer. Thus, valve pressure failures upstream of the valve produce vacuums or partial vacuums that reverse the direction of flow and may cause contaminated fluid from the nozzle to be drawn back into the source. It is essential to block this backflow and to do so as rapidly and effectively as possible. As will be apparent, the FIG. 6 embodiment is well-adapted to achieve these results. Thus, any backflow pressure immediately reduces the pressure on valve face 102 causing it to close both by being drawn into seating contact, as well as pressed into it by the resiliency of the valve body. Additionally, the reverse fluid pressure acts on the flanges of the valve body to supplement the closing action and the mechanical pressure exerted by the stem actuator (FIG. 7) adds its force. The closing action therefore is unusually rapid and positive. For example, it will be noted that the FIG. 2 embodiment requires reciprocation of its valve body into its backflow preventing position. This reciprocation is avoided in the FIG. 6 embodiment since, of course, the only movement needed for the prevention is the shift of position of the valve face from its FIG. 7 tilted position to its FIG. 6 closing position.

In operation the fluid conduit 20 is connected to a fluid source such as a water system commonly found in the home and, as explained, the fluid pressure acts to close the valve means by having the disc 54 abut the first valve seat. Next, a user may insert a stem actuator which, for example, may be a toothbrush or waterjet (when the device is used as a dental apparatus). The user single handedly grips the handpiece placing his index finger and/or thumb around the flange 68 to enable him to rotate the nozzle actuator in a 360° arc and/or to slide the actuator in a longitudinal direction. Upon application of finger forces, disc 54 allows fluid flow which can be used to clean teeth by directing jets of water at dental debris located between and around the teeth. It is to be noted that there are no special hand positions required by the user as in the prior art, just the natural single handed grasping of the device. There is no need for the thumb to be placed above a button to cause operation. In addition, twisting and turning of the nozzle actuator is greatly facilitated so that for one who is brushing his teeth no undue arm contortion is necessary to direct the water to a difficult location.

Obviously many modifications and variations of the present invention are possible in the light of the above teachings. It is therefore to be understood that within the scope of the appended claims the invention may be practiced otherwise than as specifically described.

We claim:

1. Stem-actuated tiltable valve apparatus for bidirectionally controlling flow from and backflow into a fluid source, said apparatus comprising:
   a tubular body member having an upstream and adapted to be coupled to said fluid source and a downstream end;
   a sleevelike stem actuator reciprocably mounted in the bore of said tubular member and projecting outwardly of its downstream end;
   first and second valve seats disposed in the bore of said tubular member in an axially spaced arrangement, said first valve seat being disposed in said downstream end and in proximity with the inner end of said stem actuator; and
   a valve means mounted in said bore, said means having a pair of valve faces disposed between said seats, said valve means normally being urged into closing engagement with said first seat and also being movable from an opened to a closed position relative to said second seat in response to backflow pressure;
   said stem actuator being reciprocably movable into and out of engagement with said valve means and the actuator having its inner end formed for directly engaging and tilting said valve means into an open position relative to said first seat;
   whereby said valve apparatus can be tiltably opened against said upstream pressure and also automatically closed by backflow pressure.

2. The apparatus of claim 1 wherein said valve means is wholly contained in said bore beneath said first valve seat whereby in a closed position with said first seat the valve means extends entirely in an upstream direction.

3. The apparatus of claim 1 wherein:
   the one end of the stem actuator is transversely slanted and notched providing, when viewed in longitudinal cross section, a longer arm and a shorter arm, the longer arm being adapted to tilt the valve body from total engagement with the first valve seat; and
   the valve means having as a tilting fulcrum that portion of the first valve seat adjacent the shorter arm, such that in an open position said tilted valve means is balanced between a force applied in an upstream direction by the longer arm of the stem actuator and a combined force applied in a downstream direction by the fluid flow around the valve means and the fluid within the fluid source.

4. The apparatus of claim 1 including an annular flange carried by said outwardly projecting portion of said stem actuator for facilitating the application of finger forces to cause longitudinal and rotational movement of said actuator.

5. The apparatus of claim 1 wherein said valve means is floatably mounted for reciprocable movement between said seats, said valve means including a conical member for guiding said floating movement and said valve means being urged into closing engagement with said first seat by upstream fluid pressure and also being moved into closing engagement with the second seat by said backflow downstream pressure.

6. The apparatus of claim 5 further including resilient means engaging said valve means for augmenting its reciprocable movement into a seat-closing position.

7. The apparatus of claim 1 wherein said valve means is formed of:
   first and second valve face members for respectively closing said first and second valve seats; and
   compressively resilient means engaging both of said face members for normally urging both face members into closing engagement with said first and second valve seats.

8. The apparatus of claim 7 wherein:
   said face members are disc-shaped members; and
   said resilient means is a flexible shaft medially engaging each of said disc-shaped face members and extending between the face members axially of said bore.